(12) United States Patent
Gwozdecki

(10) Patent No.: US 6,181,989 B1
(45) Date of Patent: Jan. 30, 2001

(54) AIRCRAFT ATTITUDE SENSOR AND FEEDBACK CONTROL SYSTEM

(76) Inventor: Joseph Andrew Gwozdecki, 1320 Rothwell St., Houston, TX (US) 77002-1135

( * ) Notice: Under 35 U.S.C. 154(b), the term of this patent shall be extended for 0 days.

(21) Appl. No.: 09/425,451

(22) Filed: Oct. 22, 1999

(51) Int. Cl.$^7$ ................................................ B64D 47/02
(52) U.S. Cl. ............................ 701/4; 701/10; 244/75 R; 244/16; 244/194; 250/338.1
(58) Field of Search .............................. 701/4; 250/338.1; 364/431.01; 244/16

(56) References Cited

U.S. PATENT DOCUMENTS

| | | | |
|---|---|---|---|
| 4,483,080 | * 11/1984 | Knoll | 33/286 |
| 4,591,111 | * 5/1986 | Laughter | 244/75 R |
| 4,884,205 | * 11/1989 | Hernandez-Diaz | 364/431.01 |
| 4,933,951 | * 6/1990 | Heinzman | 374/210 |
| 4,965,573 | * 10/1990 | Gallagher et al. | 340/968 |
| 5,079,419 | * 1/1992 | Falbel | 250/338.1 |
| 5,131,273 | * 7/1992 | Tabata et al. | 73/505 |
| 5,477,052 | 12/1995 | Doctor | 250/349 |
| 5,744,801 | 4/1998 | Diedrickson | 250/349 |
| 6,012,675 | * 1/2000 | Cocatre-Zilgien | 244/16 |

OTHER PUBLICATIONS

Autopilots for R/C Models, R.C. Modeler, Oct. 1999 issue, pp. 14–32.

* cited by examiner

Primary Examiner—William A. Cuchlinski, Jr.
Assistant Examiner—Tuan C. To
(74) Attorney, Agent, or Firm—Keeling Law Firm

(57) ABSTRACT

This invention is an aircraft orientation system that locates the earth's horizon, in order to determine the aircraft's attitude in the pitch and roll axes. The invention uses infrared sensors on the aircraft aimed to the sides, front and rear of the aircraft. These sensors are grouped in pairs, and detect the differences in heat levels between the left and right of the aircraft, and forward and behind the aircraft. The invention utilizes the physical condition that the earth's surface is typically measurably warmer than the sky. This difference is used to provide a reference for an aircraft regarding the attitude of the aircraft. In an alternative embodiment, a third pair of sensors detects the aircraft's vertical orientation (inverted/non-inverted) to the ground. The aircraft's attitude is determined by comparing the electrical outputs of infrared sensors, which can be used to provide a feedback to the aircraft control system to keep the aircraft in a neutral attitude. While this invention may have applications in a variety of aircraft, the preferred embodiment is described in radio controlled model airplanes and helicopters.

20 Claims, 3 Drawing Sheets

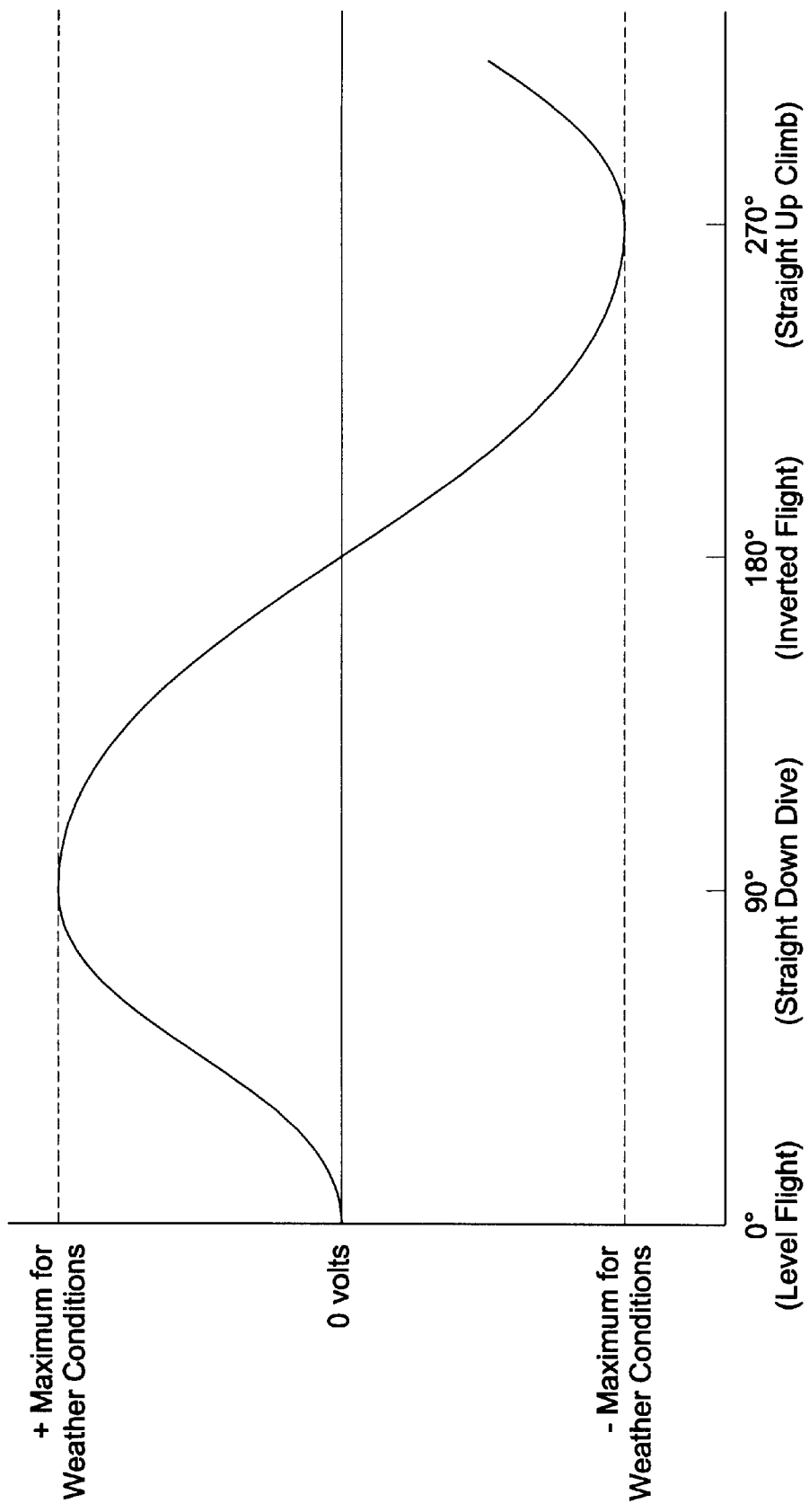

AIRCRAFT ATTITUDE SENSOR AND FEEDBACK CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

This invention relates generally to an aircraft attitude and orientation control system. Specifically, the invention uses infrared sensors oriented about an aircraft to detect the comparative heat levels of the horizon.

The surface of the earth is typically measurably warmer than the sky due to the different heat capacities of air compared to land or water. This difference is used by the present invention to provide a reference for an aircraft regarding the horizontal attitude (pitch and roll) of the aircraft and its vertical orientation (inverted/non-inverted) to the ground. This reference is measured by comparing the electrical outputs of infrared sensors, which can be used to provide feedback to the aircraft control system to keep the aircraft in a neutral attitude (straight and level) and orientation (non-inverted). While this invention may have applications in a variety of aircraft, the preferred embodiment is described in radio controlled model airplanes and helicopters.

2. Related Art

Different sensor systems for application to controlling aircraft and spacecraft are known to the prior art. There are a variety of systems for aircraft that detect the aircraft's orientation, and then provide control feedback to keep the aircraft in its prior orientation. In full scale aircraft, these systems generally take the form of automatic flight control systems or autopilots, which utilize on-board acceleration detectors in the three orthogonal axes (lateral X, longitudinal Y, and vertical Z). They usually include built-in functions for guidance and flight direction using radio navigation, magnetic heading sensors and on-board acceleration data. However, such systems are expensive, technically complex and physically large and heavy.

There are also attitude sensor systems for satellite spacecraft. Illustrative of such methods and mechanisms is that disclosed in Doctor, U.S. Pat. No. 5,477,052 ('052 patent), which discloses a method of using focused sensors for detecting the earth's horizon from space. The '052 patent discloses an array sensor system to compensate for variations in the atmosphere when measuring IR emissions from the earth. These variations are caused by seasonal or geographic changes in the temperature or radiance of the Earth's surface. The '052 patent is directed to a method of accurately locating the interface of cold space and earth, to provide a reference point for the satellite's attitude adjustment system. It does not disclose a terrestrial based system that uses the temperature gradient from land to sky to provide an orientation system. Further, the '052 patent and those directed to satellite orientation systems detect the earth's horizon using a single field of view, and do not compare multiple fields of view to determine the satellite orientation.

A similar prior art for satellites is found in the patent issued to Diedrickson, U.S. Pat. No. 5,744,801 ('081 patent), which discloses a dual array system space horizon detection system similar to the '052 patent described above. The '081 patent expressly uses pyroelectric sensor elements, which are capacitive in nature and require the incident radiant flux to be chopped or pulsed due to the voltage decay to zero due to current flow through the internal leakage resistance. In the present invention, the infrared sensors are thermopiles, which are voltage-generating devices acting as a pure resistance, and thus do not have such capacitive limitations.

There are also prior art systems using lightweight and compact systems for use in small scale and model aircraft. One type of system is rate based, measuring the rate of change in an aircraft's attitude to compute its orientation. One rate-based system uses an inertial solid state microminiature guidance system to sense angular rate in the three axes. Like mechanical gyroscope systems, these systems are initially accurate, but they require continuous on-board adjustment, typically through the use of software, to compensate for the earth's rotation of 15° per hour. They are expensive and have a relatively high power requirement, typically +12V at 250 mA.

Other pilot assist devices for model aircraft use position based systems that measure where the aircraft is relative to a physical reference point or area. One such position based systems uses a visible light reference. These systems operate on the assumption that the sky (up) is brighter then the earth (down). They typically use visible light sensors placed in orthogonal axes inside a translucent dome. A decrease in output levels from the sensors correlating to a decrease in relational light intensity is interpreted to be a deviation from level flight, and feedback signals are sent to the on-board control system. However, this system typically has noise from brightness on the earth. This "noise" is caused by different levels of brightness on the earth surface, which create an uneven light signature that is difficult for the system to read accurately. Furthermore, the system can obviously only be used in the daytime when the sun is clear and overhead. If used at sunrise or sunset, the system will roll the aircraft 90° in an attempt to orient itself to the sun on the horizon. The system is further limited to flying conditions over dry surfaces that are relatively non-reflective of visible light.

The prior art describes either a large and expensive system for full-scale aircraft, a narrowly focused system for spacecraft to detect along a single ray the space/earth horizon, or an inefficient or expensive system for measuring a small-scale aircraft's attitude. It would be a useful improvement of the prior art for an aircraft attitude measurement system to be lightweight, compact and inexpensive that provides on-board attitude feedback information that is rapidly updated, does not need to compensate for the earth's rotation, and can be used in the day or at night. This system could provide electrical information to assist in the control of small scale and model aircraft. To achieve such improvements, this invention uses commercially available pairs of inexpensive infrared sensors in an axial heat signature summation configuration. This system can then provide information to an automatic feedback control system, or to update the calibration of a gyroscope based system.

BRIEF SUMMARY OF THE INVENTION

Accordingly, the objectives of this invention are to provide, inter alia, a new and improved aircraft attitude sensor and control that:

measures the attitude of an aircraft;

uses infrared sensors that can be used in day or night;

has the capability of providing automatic feedback to an on-board aircraft control system;

has the capability of detecting and/or reversing inverted flight;

has the capability of telecommunicating attitude information; and can be remotely disengaged.

To achieve these objectives, this invention uses infrared sensors oriented in pairs on at least one orthogonal axis, to measure the heat signature of a large field of view. These fields of view are oriented in a conical zone facing opposite directions on each axis and detect a sum of heat signatures from cooler sky and warmer earth surface. Equivalent readings from each sensor indicates that their fields of view are oriented such that first sensor is detecting the same amount of cool sky and warm earth as the second sensor in the pair, thus the two sensors are aligned on a line parallel with the horizon. By placing two pairs of sensors on two axes that are orthogonal, either physically or through the use of offset compensation (electronic and/or software based), sufficient information is generated to describe the pitch and roll attitude of the aircraft. By adding a third pair of sensors in the vertical plane, the inverted/non-inverted orientation of the aircraft can similarly be determined as described below.

In a typical embodiment of this invention, the sensors are used to provide autopilot assist control for a radio controlled model aircraft. The outputs from these sensors are electrically processed, typically with differential amplifiers. This processed output is then input into an electronic circuit that combines the processed output with the output signal from the aircraft's radio control receiver, and then sends this combined signal to the model aircraft's control surface servos (servomotors).

Other objects of the invention will become apparent from time to time throughout the specification hereinafter disclosed.

BRIEF DESCRIPTION OF THE DRAWINGS

FIG. 4 is a graph showing the pitch angle and the subtracted signal output of the infrared sensors.

DETAILED DESCRIPTION OF THE INVENTION

The new and improved aircraft attitude sensor and control system is shown generally in FIGS. 1–4. In general, attitude sensor system 10 comprises at least one pair of infrared sensors, each sensor comprising an infrared light receptor 26 and an electrical output, oriented along at least one of the three orthogonal axes (X, Y and Z). Each infrared light receptor 26 is responsive to electromagnetic radiation in the infrared spectrum, preferably in the wavelength range of 2–100 micrometers.

Figure 1:
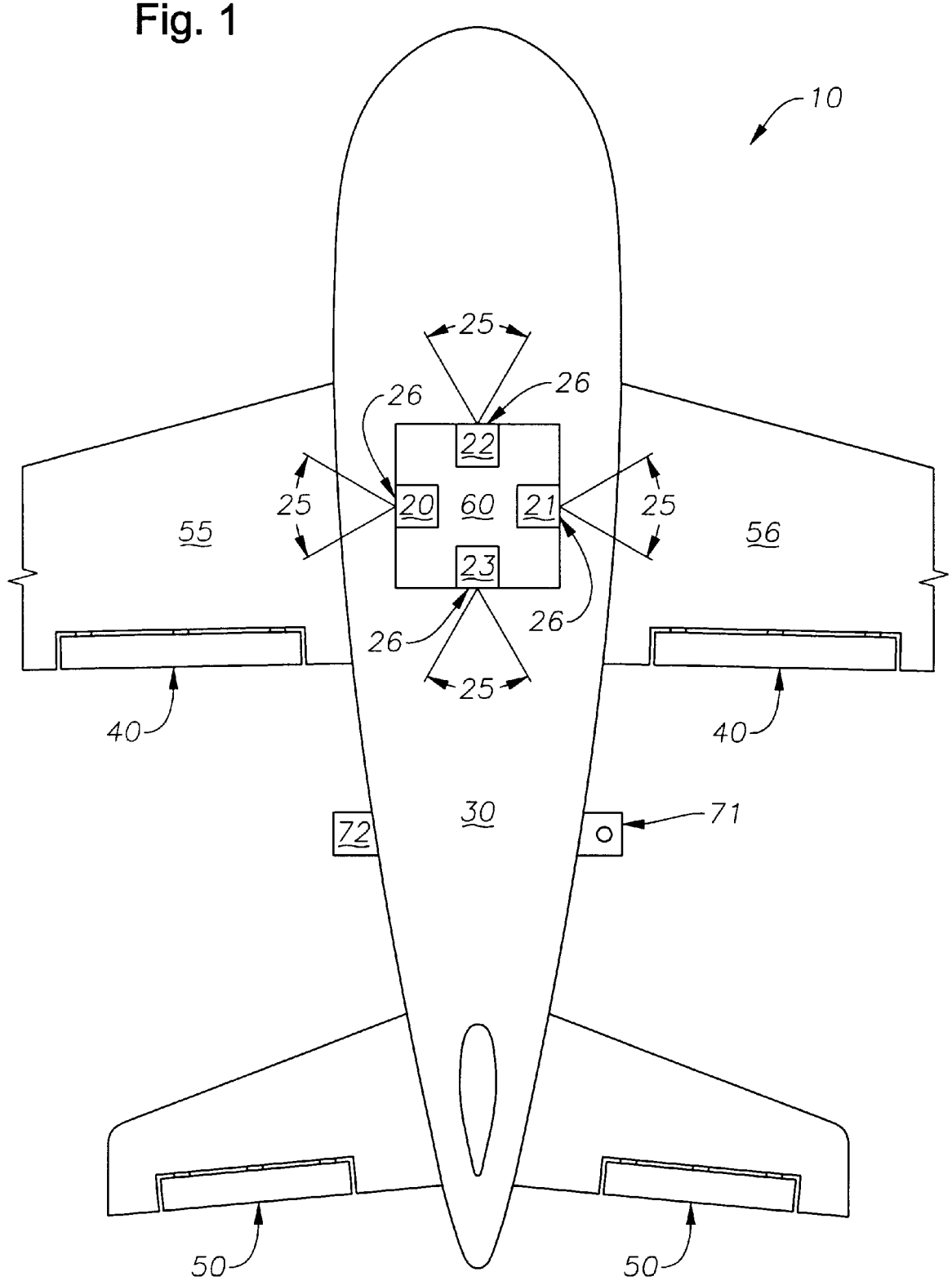
FIG. 1 is an environmental drawing showing an explanatory placement of the sensor system on a fixed wing aircraft.

FIG. 1 shows an illustrative orientation of attitude sensor system 10 relative to aircraft 30. While this and other illustrative descriptions of the example show and describe aircraft 30 as a single fixed wing aircraft, the disclosure and claims of this invention apply to all aircraft, comprising helicopters, lighter than air aircraft, motorized and non-motorized hang gliders, motorized and non-motorized parasails, hovercraft, fan propulsion aircraft and model aircraft of all types. While aircraft 30 is typically illustrated in this description as a fixed wing aircraft using ailerons to control roll and elevators to control pitch, a helicopter or other aircraft's equivalent attitude control means, control linkages and control surfaces, using those known in the art of aviation, can be controlled or manipulated using this invention.

Attitude orientation system 10 is attached to a mountable surface 60 of aircraft 30. The mountable surface 60 lies generally in a plane parallel to the earth's surface when aircraft 30 is in level flight (neutral pitch and roll). Typically, attitude sensor system 10 detects pitch and roll independently, utilizing discrete electrical circuitry branches to process information from the axes corresponding to pitch and roll. For illustrative purposes however, the axes will be described independently. Further, sensor 22 and sensor 23 are shown aligned with aircraft 30's longitudinal horizontal axis while sensor 20 and sensor 21 are shown aligned with aircraft 30's transverse horizontal axis to demonstrate the invention's concept. In practice, each pair of sensors (sensor 22 with sensor 23 and sensor 20 with sensor 21) typically are oriented on the fuselage to provide full fields of view in the transverse views, and on a wing for longitudinal views to avoid engine heat signatures. Alternatively, the two pairs of sensors can be mounted in the same location, and offset from their respective horizontal axis to avoid infrared readings from nose mounted or wing mounted engines. In the preferred embodiment, all sensors are mounted within the frame of aircraft 30, and infrared light receptors 26 are oriented through an opening in the aircraft frame or through a material that is transparent to infrared electromagnetic radiation.

Figure 2:
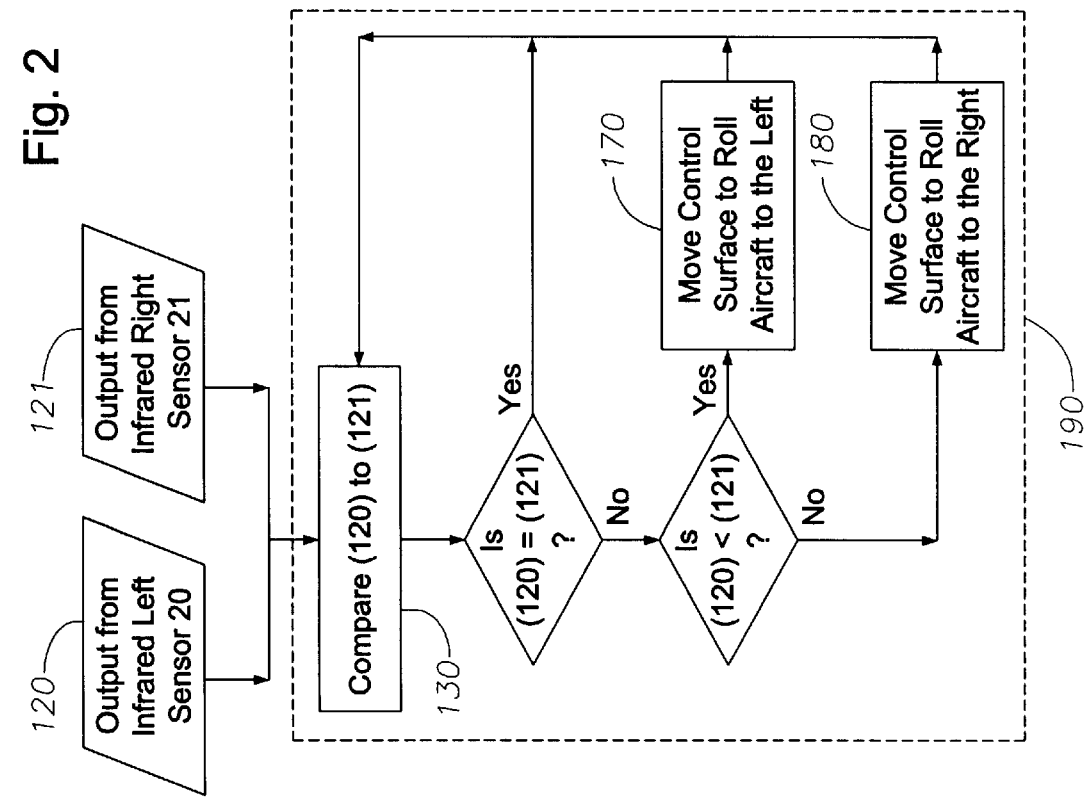
FIG. 2 is a flow chart showing sensor and feedback logic for an aircraft roll control feedback loop.

To detect roll in aircraft 30 in FIG. 1, infrared light receptor 26 of infrared sensor 20 faces to the left of aircraft 30 and infrared light receptor 26 of infrared sensor 21 faces to the right of aircraft 30. In the preferred embodiment, infrared sensor 20 and infrared sensor 21 are oriented on a single axis parallel to the transverse axis of aircraft 30. The conical fields of view 25 of infrared sensor 20 and infrared sensor 21 are in the range of 1° to 359°, preferably equal for both sensors and preferably in the range of 70° to 100°. Changes in vertical fields of view 25 for infrared sensor 20 and infrared sensor 21 result in changes of electrical output from the sensors. In the preferred embodiment, an increase in infrared radiation detected by a sensor results in a corresponding increase in voltage output from the same sensor. When aircraft 30 is in level flight over level terrain, infrared sensor 20 and infrared sensor 21 detect equivalent levels of infrared radiation. When the non-inverted level aircraft rolls in one direction, such as to the left with left wing 55 dipping downward and right wing 56 lifting upward, infrared sensor 20 detects more of the warmer ground and less of the cooler sky, while infrared sensor 21 detects more of the cooler sky and less of the warmer ground. As shown in FIG. 2, this results in an increase in the electrical output 120 from infrared sensor 20, and a decrease in the electrical output 121 from infrared sensor 21.

Output comparator 130 then functionally processes the differences in electrical output 120 and electrical output 121. In a first embodiment, output comparator 130 comprises circuitry that uses a first differential amplifier, preferably a high gain operational amplifier (Op-amp), to provide a positive or negative voltage quantifiably descriptive of electrical output 120 and electrical output 121. By way of example, if electrical output 120 is greater than electrical output 121, and electrical output 120 is functionally connected to the non-inverting input of the first differential amplifier and electrical output 121 is functionally connected to the inverting input of the same differential amplifier, then the output of the first differential amplifier would be a positive (or relatively greater in a single voltage differential amplifier) voltage proportional to the voltage difference between electrical output 120 and electrical output 121. Conversely, if aircraft 30 rolls to the right with right wing 56 dipping downward, electrical output 121 would be greater than electrical output 120, and the output of the first differential amplifier would be a negative (or lesser in a single voltage differential amplifier) voltage proportional to the voltage difference between electrical output 120 and electrical output 121. A positive output from the first differential amplifier (resulting from infrared sensor 21 being directed toward the sky due to a left roll of the aircraft) results in an aircraft control response described in control block 180 that rolls the aircraft to the right, typically through control of ailerons 40. A negative output from the first differential amplifier (resulting from infrared sensor 20 being directed toward the sky due to a right roll of the aircraft) results in an aircraft control response described in control block 170 that rolls the aircraft to the left.

In an alternative embodiment, the output from output comparator 130 is amplified using a microelectronic amplifier, whose output is fed directly to an analog aileron control surface servo (servomotor) or electromagnetically controlled aileron control surface for roll control. Likewise, the output from output comparator 230 may be amplified and fed directly to an analog elevator control surface servo or electromagnetically controlled aileron control surface for pitch control.

Figure 3:
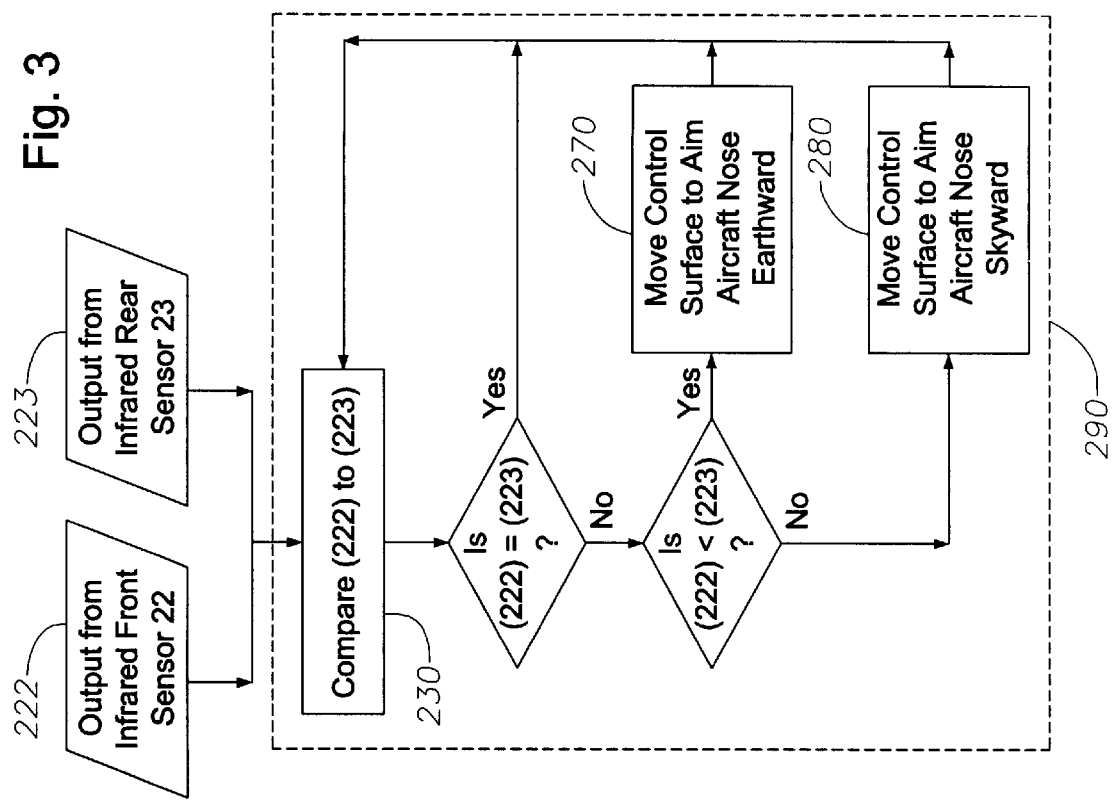
FIG. 3 is a flow chart showing sensor and feedback logic for aircraft pitch control feedback loop.

To control the pitch of example aircraft 30 in FIG. 1, infrared light receptor 26 of infrared sensor 22 faces to in front of aircraft 30 and infrared light receptor 26 of infrared sensor 23 faces behind aircraft 30. The system is analogous to that found in the sensing and control of roll in aircraft 30. In the preferred embodiment, infrared sensor 22 and infrared sensor 23 are oriented on a single axis parallel to the longitudinal axis of aircraft 30. The conical field of view 25 of infrared sensor 22 and infrared sensor 23 are in the range of 1° to 359°, preferably equal for both sensors and preferably in the range of 70° to 100°. Changes in vertical fields of view 25 for infrared sensor 22 and infrared sensor 23 result in changes of electrical output from the sensors. In the preferred embodiment, an increase in infrared radiation detected by a sensor results in a corresponding increase in voltage output from the same sensor. When aircraft 30 is in level flight over level terrain, infrared sensor 22 and infrared sensor 23 detect equivalent levels of infrared radiation to the front and rear (disregarding through electronic circuitry or software the heat from an engine, if applicable). When the non-inverted level aircraft pitches in one direction, such as nose down, infrared sensor 22 detects more of the warmer ground and less of the cooler sky, while infrared sensor 23 detects less of the warmer ground and more of the cooler sky. As shown in FIG. 3, this would result in an increase in electrical output 222 from infrared sensor 22, and an decrease in electrical output 223 from infrared sensor 23.

Output comparator 230 then functionally processes the differences in electrical output 222 and electrical output 223. In the first embodiment, output comparator 230 comprises circuitry that uses a second differential amplifier, preferably a high gain operational amplifier (Op-amp), to provide a positive or negative voltage quantifiably descriptive of electrical output 222 and electrical output 223. By way of example, if aircraft 30 pitches forward (nose down in non-inverted flight), then electrical output 222 is more than electrical output 223. With electrical output 222 functionally connected to the non-inverting input of the second differential amplifier and electrical output 223 functionally connected to the inverting input of the same second differential amplifier, then the output of the second differential amplifier would be a positive voltage proportional to the voltage difference between electrical output 222 and electrical output 223. Conversely, if aircraft 30 pitches upward (nose up), electrical output 222 would be less than electrical output 223, and the output of the second differential amplifier would be a negative voltage proportional to the voltage difference between electrical output 222 and electrical output 223. A positive output from the second differential amplifier (resulting from infrared sensor 22 being directed toward the ground due to a nose down attitude of aircraft 30) results in an aircraft control response described in control block 280 that pulls the nose of non-inverted aircraft 30 up, typically through control of elevators 50. A negative output from the differential amplifier (resulting from infrared sensor 22 being directed toward the sky due to a climb by aircraft 30) results in an aircraft control response described in control block 270 that pushes the nose down.

FIG. 4 shows a graph of sensor comparator output 230 and the aircraft pitch angle when aircraft 30 performs a forward roll. With a sensor view angle 25 of 180°, this graph is sinusoidal, allowing accurate pitch angle to be determined (preferably using trigonometric functions in the preferred embodiment's microprocessor) from the sensor voltage difference. The maximum and minimum voltages shown in FIG. 4 are typically equal in magnitude, and are calibrated for weather and temperature conditions at flight time. When the aircraft is in level non-inverted flight, differential amplifier comparator output 230 is zero, since infrared sensor 22 (aimed ahead of aircraft 30) electrical output 222 (connected to the non-inverting input) and infrared sensor 23 (aimed behind aircraft 30) electrical output 223 (connected to the inverting input) are equal. As aircraft 30 noses down, electrical output 222 increases due to increased ground heat being detected by infrared sensor 22. When aircraft 30 is aimed straight down towards the earth, electrical output 222 is at its maximum and electrical output 223 is at its minimum, thus the peak positive voltage output of comparator output 230 results. As aircraft 30 continues a forward roll, electrical output 222 decreases and electrical output 223 increases until the plane is level and inverted, electrical output 222 and electrical output 223 are once again equal, and the voltage of comparator output 230 is zero. As aircraft 30 continues the forward roll and begins aiming skyward (aircraft 30 inverted), electrical output 222 decreases and electrical output 223 increases as aircraft 30 climbs, until aircraft 30 is in a total vertical climb, and electrical output 222 is at its minimum and electrical output 223 (connected to the inverting input of the differential amplifier) is at its maximum. Comparator output 230 produces a maximum negative voltage when aircraft 30 is in a straight up vertical climb. As aircraft 30 continues past the top of the forward loop, electrical output 222 increases and electrical output 223 decreases until they are once again equal in level non-inverted flight, and comparator output 230 once again has a zero voltage.

The feedback control systems shown in lateral axis feedback control system 190 and longitudinal axis feedback control system 290 are typically continuous, with a refresh rate based on the response rate of the sensor outputs. The preferred range of the sensor output response rate is 1–100 milliseconds.

The information developed from the pairs of sensors can be utilized in a feedback pilot assist system as described above and below. This same electronic information can also be displayed, either through a visual display or an aural display, remotely or on the aircraft. Typically, such a visual display is provided using seven-segment or matrix LED's or LCD's to show angle of climb or descent (positive or negative pitch) or angle of roll (left or right). However, any visual or aural (e.g. digitized synthetic voice processor) median may be used to represent the aircraft orientation.

In the preferred embodiment of the aircraft attitude sensor and control system, lateral axis feedback control system 190 and longitudinal axis feedback control system 290 are microprocessor based. Another preferred feature of this embodiment is the utilization of a third pair (depicted in FIG. 1 as upward sensor 71 and downward sensor 72) of infrared sensors attached to a mountable surface on aircraft 30 that is normal to the earth's surface when aircraft is in straight and level flight. This third pair of infrared sensors provide information regarding the inverted/non-inverted orientation of the aircraft. Using the same thermal principals (cooler sky and warmer ground), sensor characteristics (higher voltage output from higher infrared light input) and comparator characteristics (differential amplifier, preferably a high gain Operational Amplifier, with quantitative positive or negative voltages, or alternatively lesser and greater positive voltages in a single voltage differential amplifier) as described above for the pitch and roll of the aircraft, the third pair of sensors detect whether the aircraft is inverted or non-inverted. If the aircraft is non-inverted, the top sensor is oriented towards the cooler sky and the bottom sensor toward the warmer ground, resulting in a (typically) positive (or greater in a single voltage differential amplifier) output from the differential amplifier. If the aircraft crosses the horizontal plane (either in pitch or roll) into an inverted orientation, the bottom sensor will be oriented more towards the cooler sky and the top sensor will be oriented more towards the warmer ground, resulting in a negative (or lesser in a single voltage differential amplifier) output from the differential amplifier. This change in differential amplifier output polarity (or relative voltage level) provides information to the feedback control system that aircraft 30 is inverted, and therefore pitch and roll control surfaces must be controlled inversely with respect to the ground. When the aircraft is in inverted flight, pitch, roll and yaw controls must likewise be inverted. That is, when the aircraft is inverted, a signal to an elevator control surface to go "up" will obviously cause the aircraft to go "down" towards the earth. Likewise, "left" becomes "right" and "right" becomes "left" when controlling the position of the aircraft as compared to normal control commands. To compensate for this, the preferred embodiment's software detects the presence of inverted flight. When the aircraft is inverted, commands from the radio control receiver are reversed, such that remote commands to turn a specified direction are followed by the aircraft whether inverted or not.

In the preferred embodiment of the aircraft attitude sensor and control system utilizing a microprocessor, inputs from all three pairs of infrared sensors are first processed through their own differential amplifiers as described above, with the resulting outputs input into an analog to digital converter (ADC). The output of the ADC is input into the microprocessor. The output from sensor 22 and sensor 23 are subtracted and the result is used in a pitch feedback loop. A true pitch angle to the horizon is obtained by the formula:

$$\text{Pitch Angle} = \text{arc tangent}\left(\frac{\text{sensor 22 output} - \text{sensor 23 output}}{\text{sensor 71 output} - \text{sensor 72 output}}\right)$$

Similarly, the roll angle to the horizon is obtained by the formula:

$$\text{Roll Angle} = \text{arc tangent}\left(\frac{\text{sensor 20 output} - \text{sensor 21 output}}{\text{sensor 71 output} - \text{sensor 72 output}}\right)$$

The microprocessor then outputs a signal to the control surface controllers, typically servos in a model aircraft, through a pulse width modulator, demultiplexer and/or digital to analog converter (DAC). If the control system is used on a remote controlled aircraft, the microprocessor also receives input from the remote control radio receiver to integrate control input from the operator with the orientation sensor outputs.

In an alternative embodiment, the output from the infrared sensors is processed by differential amplifiers as described above, but the outputs of the differential amplifiers are input into an analog circuit between the remote control radio receiver and an analog control surface servo using electronic circuitry known in the field of electronics.

In both the preferred embodiment and alternative embodiment described for processing the output signals of the sensors, the sensors are typically used to provide autopilot assist control for a radio controlled model aircraft. The outputs from these sensors are electrically processed as described above, and this processed output is then input into an electronic circuit, preferably microprocessor based using technology well known in the field of electronics, that combines the processed output with the output signal from the aircraft's radio control receiver, and then sends this combined signal to the model aircraft's control surface servos.

While this invention is described for clarity at using distinct pairs of infrared sensors, in an alternative embodiment the pairs can use one shared sensor. In one such embodiment, three sensors are aligned roughly orthogonal on the X, Y and Z axes. For purposes of illustration, if the Y-axis sensor is oriented to look upward from aircraft 30 in level non-inverted flight, the X-axis sensor is oriented to look to one side of aircraft 30, and the Z-axis is oriented to look in front of aircraft 30, then the following calculations can be performed. If the Y-axis sensor detects an increase in ground heat, the aircraft is either in a pitch or roll. If the X-axis sensor is oriented to the left of the aircraft, a roll to the left results in an increase in the electrical output of X-axis sensor, while a roll to the right results in a decrease in the electrical output of the X-axis sensor. Pitch is detected when the Y-axis sensor detects more ground heat, and the Z-axis sensor detects more ground heat (dive) or less ground heat (climb). The attitude of aircraft 30 is electrically represented by a change comparator. When the Y-axis detects a change in attitude, a change comparator compares the change in both the X-axis sensor and Z-axis sensor to electrically represent the attitude of aircraft 30. This electrical representation can be input into a display and/or control means of aircraft 30 in a similar manner as previously described. This alternative embodiment functions equivalently if the Y-axis sensor is oriented toward the ground from the aircraft during level inverted flight.

In another alternative embodiment, one sensor can be used to detect only roll of aircraft 30. One sensor can be oriented to either the left or right side of the aircraft aligned on an axis normal to the longitudinal axis of aircraft 30 and normal to the earth's surface when aircraft 30 is in level non-inverted flight. As the sensor detects more or less heat when the aircraft rolls, this change in heat detected is converted into an electrical signal output representing aircraft 30's roll orientation, as described in the preferred embodiment, and the signal output represented aurally or visually and/or input into the aircraft control system in a similar manner as described in the preferred embodiment.

Finally, the control system is capable of being quickly disengaged. This disengagement is in the form of an override switch activated remotely. In the preferred embodiment, this disengagement is performed through software in a microprocessor. A signal is sent from the remote pilot to the receiver of the model aircraft signaling the microprocessor to stop processing inputs from the sensors, and allow throughput control from the radio receiver to the control servos. Alternatively, this disengagement is a double throw switch that in normal operation connects the microprocessor (which receives input from the radio receiver and infrared sensors) with the control servos, and in disengagement mode switches to bypass the microprocessor and completes the electrical circuit directly between the radio receiver and the control servos. The double throw switch is typically moved through a servo mechanical movement. However, the break can also be performed electronically through standard circuitry that detects a failure in the sensor or the sensor/feedback means.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. An aircraft orientation sensing device comprising:
    a means for detecting an aircraft's attitude with respect to the Earth's surface;
    said means for detection comprising at least two horizontal infrared light sensors;
    each of said at least two horizontal infrared light sensors being mounted to said aircraft;
    each of said at least two horizontal infrared light sensors including a first horizontal sensor and a second horizontal sensor spatially oriented to detect different fields of view;
    said first horizontal sensor and said second horizontal sensor each including an infrared light receptor and an electrical output means;
    each of said horizontal sensor electrical output means generating a horizontal electrical output correlating to the level of infrared light received by said first horizontal sensor and said second horizontal sensor; and
    horizontal comparator means for electrically processing said horizontal electrical outputs from said first horizontal sensor and said second horizontal sensor to electrically represent said aircraft's attitude with respect to the Earth's surface.

2. An aircraft orientation sensing device as in claim 1, further comprising means to display said aircraft's attitude with respect to the Earth's surface.

3. An aircraft orientation sensing device as in claim 1, wherein said horizontal comparator means being operatively connected to said at least two horizontal infrared light sensors and to an aircraft control system.

4. An aircraft orientation sensing device as in claim 3, wherein:
    said horizontal comparator means comprising a differential amplifier,
    said differential amplifier having an inverting input connection electrically connected to said first horizontal sensor;
    said differential amplifier having a noninverting input connection electrically connected to said second horizontal sensor; and
    said differential amplifier having an output connection electrically connected to said aircraft control system.

5. An aircraft orientation sensing device as in claim 4, wherein:
    said aircraft control system comprising said differential amplifier, an analog-to-digital converter, a microprocessor and an aircraft attitude control means;
    said analog-to-digital converter electrically connected between said differential amplifier and said microprocessor;
    said microprocessor including software for processing an electronic signal from said analog-to-digital converter; and
    said microprocessor including output means for communicating an electrical control input to said aircraft attitude control means.

6. An aircraft orientation sensing device as in claim 1, wherein said infrared light receptors of said first horizontal sensor and said second horizontal sensor face in opposite directions.

7. An aircraft orientation sensing device as in claim 1, further comprising:
    means for determining said aircraft's vertical orientation;
    said means for determining said aircraft's vertical orientation comprising a pair of infrared light sensors mounted to said aircraft;
    said pair of infrared light sensors including a first vertical sensor and a second vertical sensor;
    said first vertical sensor and said second vertical sensor each including an infrared light receptor and an electrical output means;
    said vertical sensor electrical output means each generating vertical electrical output correlating to the level of infrared light received by said first vertical sensor and said second vertical sensor;
    said first vertical sensor infrared light receptor and said second vertical sensor infrared light receptor facing opposite directions;
    said first vertical sensor infrared light receptor facing away from the earth's surface and said second vertical sensor infrared light receptor facing toward the earth's surface when said aircraft is in level and non-inverted orientation with respect to the earth's surface; and
    vertical comparator means for electrically processing said vertical electrical output from said first vertical sensor and said second vertical sensor to electrically represent said aircraft's vertical orientation.

8. An aircraft orientation sensing device as in claim 7 further comprising means to display said aircraft's vertical orientation.

9. An aircraft orientation sensing device as in claim 7, wherein:
    said means for determining said aircraft's vertical orientation operatively connected to an aircraft control system of said aircraft; and said operative connection including means for inverting remote control commands to said aircraft control system when said aircraft is in an inverted vertical orientation.

10. An aircraft orientation sensing device as in claim 9, wherein:
said operative connection to said aircraft control system comprising a microprocessor.

11. An aircraft orientation sensing device as in claim 1, wherein:
said means for electrically processing said electrical output from said first sensor and said second sensor further comprising means for calibrating a gyroscopic attitude sensing system.

12. An aircraft orientation sensing device as in claim 3, further comprising means for remote disconnection of said horizontal comparator means with said aircraft control system.

13. An aircraft orientation sensing device as in claim 1, wherein said at least one pair of infrared sensors are responsive to electromagnetic radiation in the wavelength range of 2–100 micrometers.

14. An aircraft vertical orientation sensing device comprising:
means for determining an aircraft's vertical orientation;
said means for determining said aircraft's vertical orientation comprising at least two infrared light sensors mounted to said aircraft, said at least two sensors including a first vertical sensor and a second vertical sensor;
said first vertical sensor and said second vertical sensor each including an infrared light receptor and an electrical output means;
said electrical output means each generating vertical electrical output correlating to the level of infrared light received by said first vertical sensor and said second vertical sensor;
said first vertical sensor infrared light receptor and said second vertical sensor infrared light receptor facing opposite directions;
said first vertical sensor infrared light receptor facing away from the earth's surface and said second vertical sensor infrared light receptor facing toward the earth's surface when said aircraft is in level and non-inverted orientation with respect to the earth's surface; and
comparator means for electrically processing said vertical electrical output from said first vertical sensor and said second vertical sensor to electrically represent said aircraft's vertical orientation.

15. An aircraft vertical orientation sensing device as in claim 14 further comprising means to display said aircraft's vertical orientation.

16. An aircraft vertical orientation sensing device as in claim 14, further comprising:
said means for determining said aircraft's vertical orientation being operatively connected to a control system of said aircraft; and
said operative connection comprising means for inverting remote control commands to said aircraft control system when said aircraft is in inverted vertical orientation.

17. An aircraft orientation sensing device as in claim 16, wherein:
said operative connection to said control system comprising a microprocessor.

18. An aircraft orientation sensing device comprising:
a means for detecting an aircraft's attitude,
said means for detection comprising at least one infrared sensor;
said sensor mounted to an aircraft on an axis normal to said aircraft's longitudinal axis and normal to the earth's surface when said aircraft is in level non-inverted flight;
said sensor including an infrared light receptor and an electrical output means;
said sensor's electrical output means generating an electrical output correlating to the level of infrared light received by said sensor; and
a change comparator means for electrically processing said sensor's output means to electrically represent said aircraft's roll attitude.

19. An aircraft orientation sensing device as in claim 18, wherein:
said at least one infrared sensor comprises three infrared sensors oriented on roughly orthogonal axes;
each of said three infrared sensors including an infrared light receptor and an electrical output means;
each of said three infrared sensors' electrical output means generating an electrical output correlating to the level of infrared light received by said sensor; and
said change comparator means for electrically processing said sensors' output means electrically representing an attitude with respect to Earth's surface of said aircraft and a vertical orientation of said aircraft.

20. An aircraft orientation sensing device as in claim 19, wherein said change comparator means being operatively connected to said aircraft's control system.

* * * * *